(12) United States Patent
Konishi

(10) Patent No.: US 10,801,893 B2
(45) Date of Patent: Oct. 13, 2020

(54) SPECTROSCOPE, WAVELENGTH MEASURING DEVICE, AND SPECTRUM MEASURING METHOD

(71) Applicant: OSAKA UNIVERSITY, Osaka (JP)

(72) Inventor: Tsuyoshi Konishi, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 0 days.

(21) Appl. No.: 16/316,928

(22) PCT Filed: Jul. 4, 2017

(86) PCT No.: PCT/JP2017/024479
§ 371 (c)(1),
(2) Date: Jan. 10, 2019

(87) PCT Pub. No.: WO2018/012351
PCT Pub. Date: Jan. 18, 2018

(65) Prior Publication Data
US 2019/0301938 A1    Oct. 3, 2019

(30) Foreign Application Priority Data
Jul. 11, 2016  (JP) ................... 2016-137012

(51) Int. Cl.
*G01J 3/45*  (2006.01)
*G01J 9/02*  (2006.01)
(Continued)

(52) U.S. Cl.
CPC .............. *G01J 3/45* (2013.01); *G01B 11/254* (2013.01); *G01J 3/04* (2013.01); *G01J 9/02* (2013.01);
(Continued)

(58) Field of Classification Search
CPC ...... G01J 3/45; G01J 9/0246; G01J 2003/451; G01J 2009/0234; G01B 11/254
See application file for complete search history.

(56) References Cited

U.S. PATENT DOCUMENTS

| 5,519,533 A | 5/1996 | Nomura et al. |
| 5,949,390 A | 9/1999 | Nomura et al. |
(Continued)

FOREIGN PATENT DOCUMENTS

| CN | 1643338 | 7/2005 |
| JP | 07-248468 | 9/1995 |
(Continued)

OTHER PUBLICATIONS

International Search Report dated Oct. 3, 2017 in International (PCT) Application No. PCT/JP2017/024479.
(Continued)

*Primary Examiner* — Maurice C Smith
(74) *Attorney, Agent, or Firm* — Wenderoth, Lind & Ponack, L.L.P.

(57) ABSTRACT

A spectroscope for measuring a spectrum of input light includes a fringe former that forms first fringes having a first pitch by splitting the input light, a diffraction grating that disperses each of the first fringes, a moire pattern former that forms a moire pattern by overlaying the first fringes that have been dispersed, on second fringes having a second pitch different from the first pitch, and an image pickup device that measures the spectrum of the input light by detecting the moire pattern. At least one of the fringe former and the moire pattern former includes a cylindrical lens array.

3 Claims, 12 Drawing Sheets

(51) Int. Cl.
*G01J 3/04* (2006.01)
*G01B 11/25* (2006.01)

(52) U.S. Cl.
CPC ....... *G01J 9/0246* (2013.01); *G01J 2003/451* (2013.01); *G01J 2009/0234* (2013.01)

(56) References Cited

U.S. PATENT DOCUMENTS

| | | | | |
|---|---|---|---|---|
| 6,084,712 | A * | 7/2000 | Harding | G02B 27/60 356/618 |
| 9,177,433 | B2 * | 11/2015 | Holmes | G07D 7/207 |
| 2003/0179385 | A1 * | 9/2003 | Fujiwara | G01B 11/254 356/605 |
| 2005/0128594 | A1 | 6/2005 | Hanson et al. | |
| 2007/0252975 | A1 * | 11/2007 | Liang | G01B 11/254 356/124 |
| 2009/0268212 | A1 * | 10/2009 | Ko | G01B 11/254 356/511 |
| 2017/0336714 | A1 * | 11/2017 | Arnz | G03F 7/70266 |

FOREIGN PATENT DOCUMENTS

| | | |
|---|---|---|
| JP | 07-322367 | 12/1995 |
| JP | 09-015549 | 1/1997 |
| JP | 2016-057224 | 4/2016 |

OTHER PUBLICATIONS

Livnat, et al., "Moire pattern of a linear grid with a lenticular grating", Optics Letters, Optical Society of America, vol. 7, No. 6, pp. 253-255, Jun. 1982.

Erskine et al., "Novel Interferometer Spectrometer for Sensitive Stellar Radial Velocimetry", Imaging the Universe in Three Dimensions: Astrophysics with Advanced Multi-Wavelength Imaging Devises, ASP Conference Series, vol. 195, pp. 501-507, 2000.

Office Action with search report dated Jun. 22, 2020 in corresponding Chinese Patent Application No. 201780041393.2, with English translation of search report.

* cited by examiner

SPECTROSCOPE, WAVELENGTH MEASURING DEVICE, AND SPECTRUM MEASURING METHOD

TECHNICAL FIELD

The present invention relates to a spectroscope and a spectrum measuring method for measuring the spectrum of input light, and a wavelength measuring device for measuring the wavelength of input light.

BACKGROUND ART

Conventionally, in the measurement of light wavelengths or spectrum, dispersive devices (e.g., a diffraction grating, a prism, or an etalon) with angular dispersion relative to a wavelength of light or interferometers are used (for example, see PTL 1).

In such a measurement, there is a trade-off relationship between the bandwidth of measurable light (hereinafter, will be referred to as a measurement band) and the degree of resolving power. Generally, a wide measurement band has a resolving power of several nanometers and a narrow measurement band has a resolving power of several picometers.

CITATION LIST

Patent Literature

[PTL 1] Japanese Unexamined Patent Application Publication No. 2016-057224

SUMMARY OF INVENTION

Technical Problem

For an explanation of the problem of the related art, a spectroscope disclosed in PTL 1 will be first discussed below. FIG. 1 is a diagram illustrating the configuration of a spectroscope 10 disclosed in PTL 1. The spectroscope 10 includes a first slit array 12, a diffraction grating 14, and a second slit array 17.

The first slit array 12 has a plurality of slits arranged with a first pitch p1. The diffraction grating 14 is a reflection grating characterized by a diffraction angle that changes with respect to a light wavelength (angular dispersion). The second slit array 17 has a plurality of slits arranged with a second pitch p2 different from the first pitch p1. In this configuration, the spectrum of input light is measured by detecting a moire pattern generated by overlaying the image of the first slit array 12 (dispersed first fringes) and the second slit array 17 (second fringes).

Moire patterns are beat patterns generated by displacing the periods of periodic patterns overlaid on one another. The position of a moire pattern (the position of a high-intensity region in a moire pattern) considerably changes according to the positional relationship between the periodic patterns. In other words, the position of the moire pattern changes greater than a change of the position of the image of the first slit array 12 according to the wavelength of input light.

Thus, the spectrum of input light can be measured by moire pattern measurement. In this case, in order to improve the resolving power of the spectrum of input light, it is necessary to reduce the width of the high-intensity region of the moire pattern as well as a difference between the first pitch p1 and the second pitch p2, so that the first slit array 12 and the second slit array 17 require smaller slit widths. In other words, it is necessary to increase an aspect ratio, that is, the ratio of the width of a low-intensity region to the width of the high-intensity region for the first fringes and the second fringes.

The slit widths are however limited in the fabrication. Moreover, a reduction in slit width may increase a light quantity loss, leading to difficulty in measuring the spectrum of weak light. This limits an improvement in the aspect ratio of the slit array (that is, a reduction in opening ratio) and also limits an improvement of spectrum resolving power during the measurement of the spectrum.

It is therefore an object of the present invention to provide a spectroscope that can improve spectrum resolving power when measuring a spectrum using a moire pattern.

Solution to Problem

A spectroscope according to an aspect of the present invention is a spectroscope for measuring a spectrum of input light, and includes: a fringe former that forms first fringes having a first pitch by splitting the input light; a dispersive device that disperses each of the first fringes; a moire pattern former that forms a moire pattern by overlaying the first fringes that have been dispersed, on second fringes having a second pitch different from the first pitch; and a measuring device that measures the spectrum of the input light by detecting the moire pattern, wherein at least one of the fringe former and the moire pattern former includes a cylindrical lens array.

With this configuration, at least one of the fringe former and the moire pattern former can include a cylindrical lens array. On the cylindrical lens array, light incident on each cylindrical lens is condensed onto a corresponding line. In other words, the cylindrical lens array can reduce the width of the high-intensity region of the fringe as compared with the slit array because of the effect of condensing light in addition to the effect of reducing the width of the cylindrical lens. Unlike the slit array, the cylindrical lens array does not block the input light, thereby suppressing a light quantity loss. In other words, the spectroscope including the cylindrical lens instead of the slit array can suppress a loss of a light quantity, thereby improving the spectrum resolving power.

For example, the fringe former may include the cylindrical lens array that forms the first fringes.

With this configuration, the fringe former can include the cylindrical lens array. This can form a high-intensity region having a small width, that is, the first fringe having a high aspect ratio. Furthermore, this configuration can also suppress a light quantity loss caused by the formation of the first fringes. For example, if the first fringe has an aspect ratio of 10, a light quantity loss can be reduced to one tenth or less than that of the slit array.

For example, the moire pattern former may include the cylindrical lens array that forms the moire pattern, and the measuring device may detect the moire pattern at a focal position of the cylindrical lens array of the moire pattern former.

With this configuration, the moire pattern former can include the cylindrical lens array. Hence, a light quantity loss can be smaller than that of the slit array. If the moire pattern former is a slit array, the moire pattern is formed at the position of the slit array. For this reason, in order to eliminate the influence of blurring caused by defocus in the detection of the moire pattern, a relay lens or the like is necessary for forming an image of the moire pattern at a position separated from the slit array. If the moire pattern former is the cylindrical lens array, the moire pattern is formed at the position (focal position) separated from the cylindrical lens array. Thus, the measuring device can detect the moire pattern at the focal position of the cylindrical lens array. Specifically, the measuring device can be disposed at the formation position of the moire pattern, thereby eliminating the need for a relay lens. This can reduce the number of parts, thereby downsizing the spectroscope.

A spectroscope according to an aspect of the present invention is a spectroscope for measuring a spectrum of input light, and includes: a fringe former that forms first fringes having a first pitch by splitting the input light; a dispersive device that disperses each of the first fringes; a moire pattern former that forms a moire pattern by overlaying the first fringes that have been dispersed, on second fringes having a second pitch different from the first pitch; and a measuring device that measures the spectrum of the input light by detecting the moire pattern, wherein at least one of the fringe former and the moire pattern former includes a cylindrical lens array.

With this configuration, the same effect as the spectroscope can suppress a light quantity loss, thereby improving the wavelength resolving power.

It should be noted that these generic or specific aspects may be realized as a system, a method, an integrated circuit, a computer program, or a computer-readable recording medium such as a CD-ROM, or may be realized by any combination of a system, a method, an integrated circuit, a computer program, and a recording medium.

Advantageous Effect of Invention

A spectroscope according to an aspect of the present invention can improve spectrum resolving power when measuring a spectrum using a moire pattern.

DESCRIPTION OF EMBODIMENTS

Embodiments will be described in detail below with reference to the drawings.

It should be noted that the embodiments described below represent generic or specific examples. The numerical values, shapes, materials, structural components, the arrangement and connection of the structural components, steps, the processing order of the steps, etc. shown in the following embodiments are mere examples, and are not intended to limit the scope of the present disclosure. Furthermore, among the structural components in the following embodiments, components not recited in any one of the independent claims which indicated the broadest concepts are described as optional structural components.

Furthermore, the respective figures are schematic diagrams and are not necessarily precise illustrations. Furthermore, in the respective figures, identical components are assigned the same reference signs. Moreover, in the following embodiments, there are instances in which expressions such as approximately the same are used. For example, approximately the same means, not only perfectly the same, but also substantially the same, that is, including an error of several percent.

Embodiment 1

Embodiment 1 will be described below with reference to the accompanying drawings.

[Spectroscope Configuration]

Figure 1:
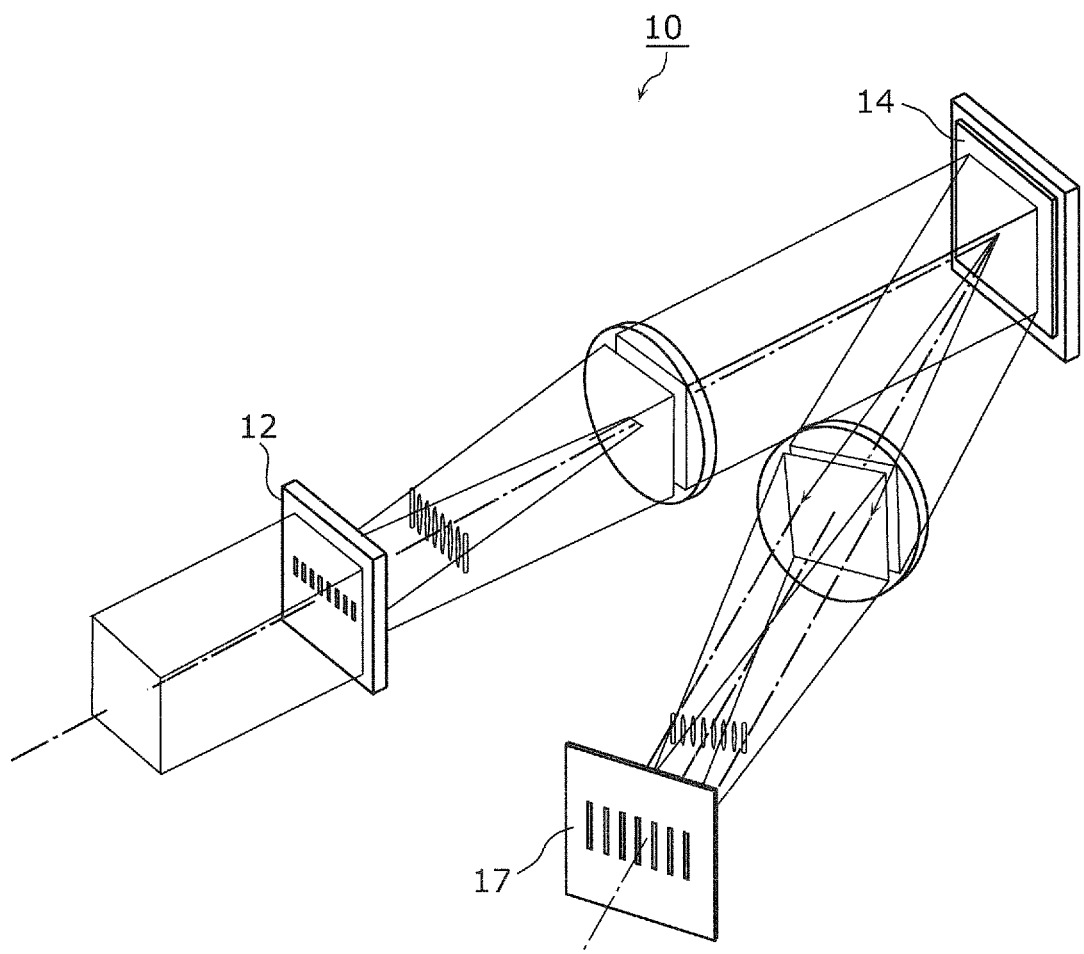
FIG. 1 is a diagram illustrating the configuration of a spectroscope disclosed in PTL 1.
Figure 2:
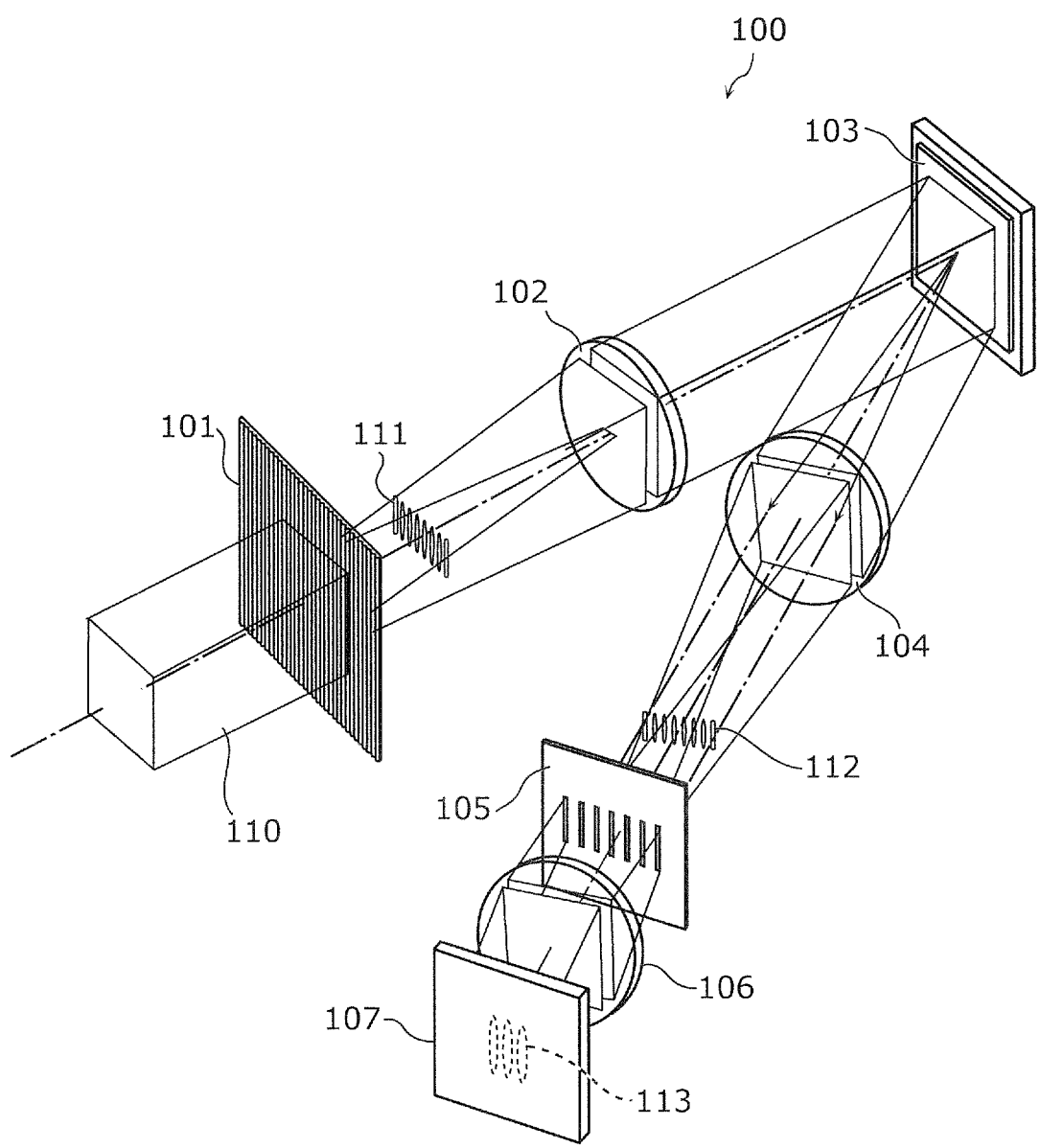
FIG. 2 is a diagram illustrating the configuration of a spectroscope according to Embodiment 1.
Figure 3:
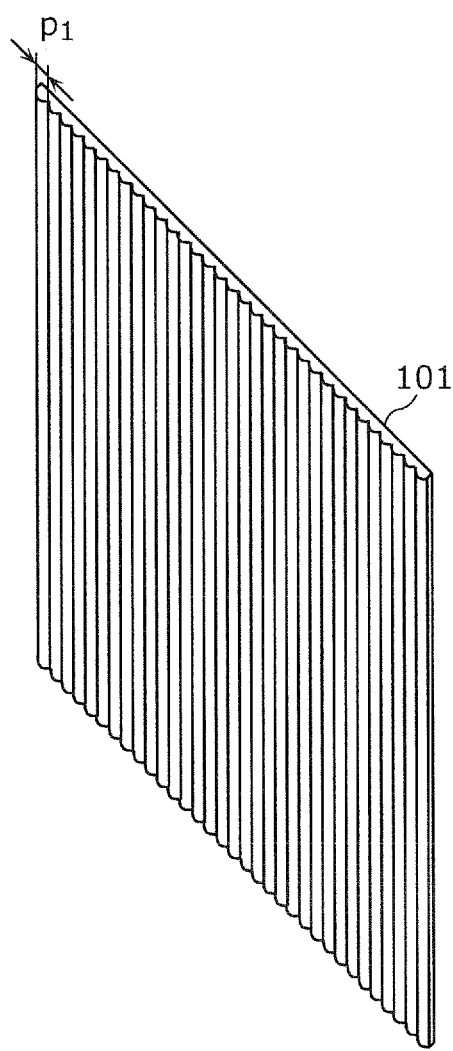
FIG. 3 is a perspective view illustrating a cylindrical lens array according to Embodiment 1.

FIG. 2 is a diagram illustrating the configuration of a spectroscope 100 according to Embodiment 1. FIG. 3 is a perspective view showing a cylindrical lens array 101 according to Embodiment 1.

As shown in FIG. 2, the spectroscope 100 includes the cylindrical lens array 101, a first lens 102, a diffraction grating 103, a second lens 104, a slit array 105, a third lens 106, and an image pickup device 107.

The cylindrical lens array 101 is an example of a fringe former that forms first fringes 111 with a first pitch p1 by splitting input light 110. In other words, the cylindrical lens array 101 reproduces a plurality of linear light beams from the input light 110. As shown in FIG. 3, the cylindrical lens array 101 has a plurality of cylindrical lenses horizontally placed with the first pitch p1 (e.g., about 0.5 mm).

Light incident on each cylindrical lens is condensed into a corresponding line, thereby forming the first fringes 111 including a plurality of narrow lines. This line corresponds to the slit of the slit array and forms a high-intensity region. At this point, the cylindrical lens array 101 can form the first fringes 111 having an aspect ratio of at least 10.

The first lens 102 is a collimating lens for condensing the light of the first fringes 111 into parallel rays.

The diffraction grating 103 is an example of a dispersive device that disperse each of the first fringes. In the present embodiment, the diffraction grating 103 is a reflection grating having the property of changing a diffraction angle with respect to a light wavelength (angular dispersion). The dispersive device is not limited to a diffraction grating.

The second lens 104 is a lens for condensing light dispersed by the diffraction grating 103, onto the slit array 105. In other words, the second lens 104 forms first fringes 112 dispersed on the slit array 105.

The slit array 105 is an example of a moire pattern former that forms a moire pattern 113 by overlaying the dispersed first fringes 112 on second fringes with a second pitch p2 (e.g., about 0.42 mm) different from the first pitch p1. The slit array 105 forms the second fringes with a plurality of slits placed with the second pitch p2 in the same direction as the dispersed first fringes 112.

The moire pattern is a beat pattern generated by displacing the periods of periodic patterns overlaid on one another. The position of the moire pattern (an intensity peak position in the moire pattern) changes according to the positional relationship between periodic patterns.

A principle for measuring the spectrum of input light 110 using the moire pattern 113 will be discussed later in accordance with the drawings.

The third lens 106 is a lens for forming an image of the moire pattern 113 on the imaging surface of the image pickup device 107, the moire pattern 113 being formed immediately behind the slit array 105.

The image pickup device 107 is an example of a measuring device that measures the spectrum of the input light 110 by detecting the moire pattern 113. The image pickup device 107 is, for example, a solid-state image pickup device such as a CCD (Charge Coupled Device) image sensor or a CMOS (Complementary Metal Oxide Semiconductor) image sensor.

[Principle for Measuring a Spectrum]

Figure 4:
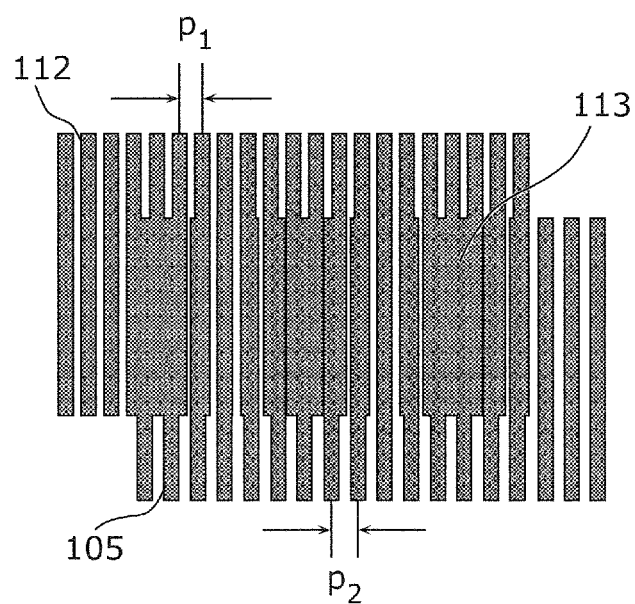
FIG. 4 is a diagram illustrating an overlap of dispersed first fringes and second fringes according to Embodiment 1.
Figure 5:
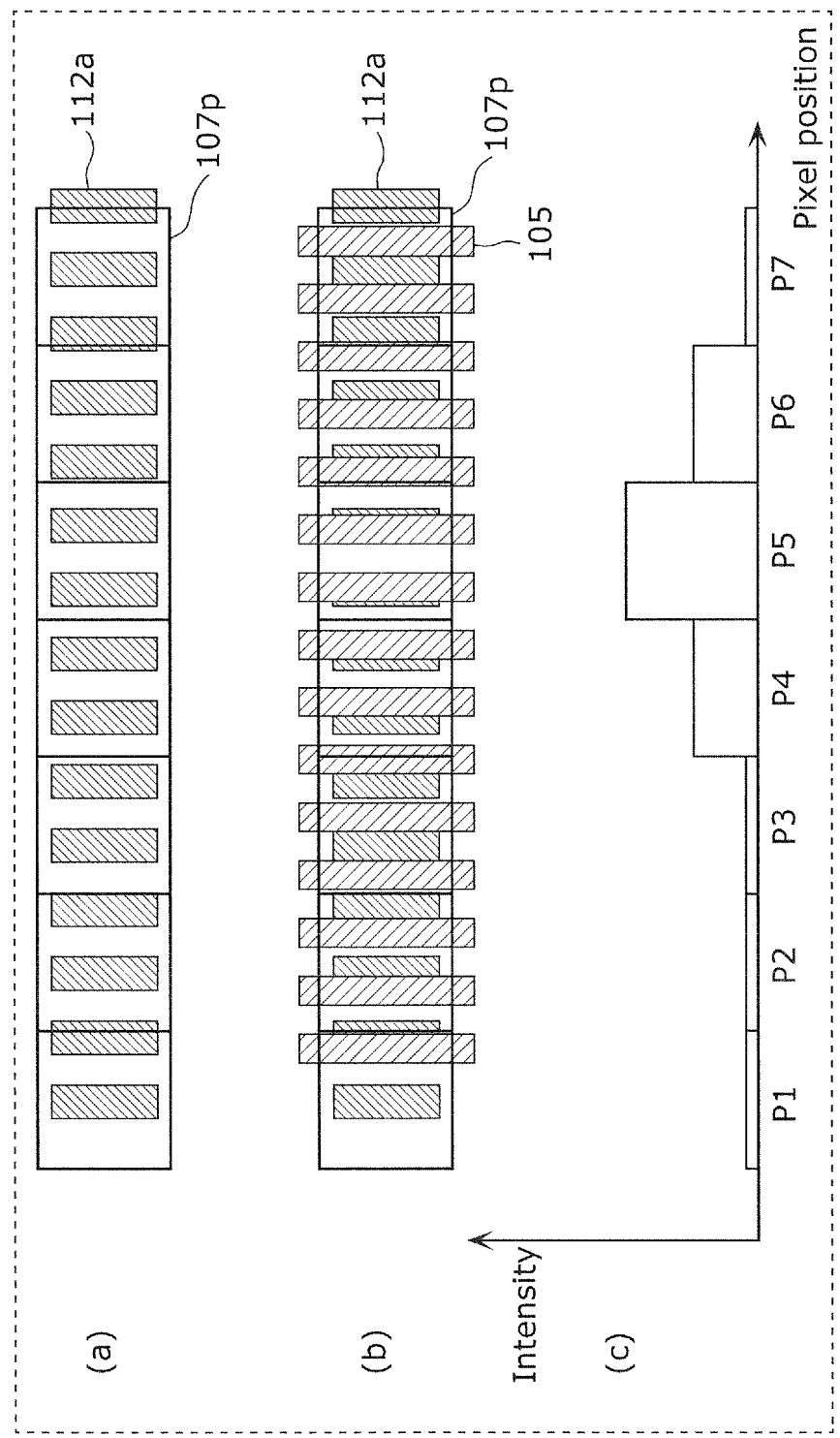
FIG. 5 shows the moire pattern detection results when the input light is monochromatic light of a first wavelength.
Figure 6:
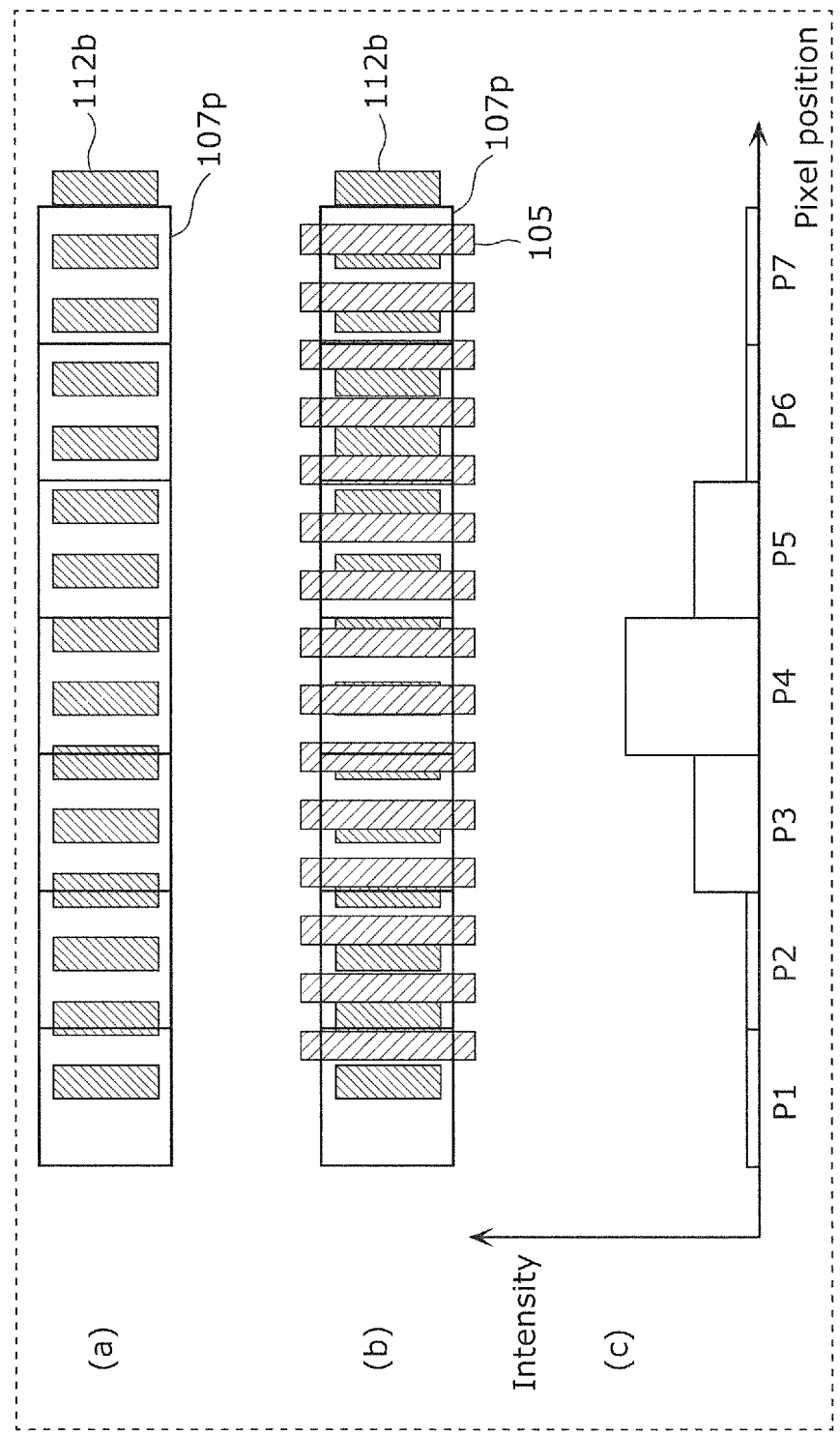
FIG. 6 shows the moire pattern detection results when the input light is monochromatic light of a second wavelength.
Figure 7:
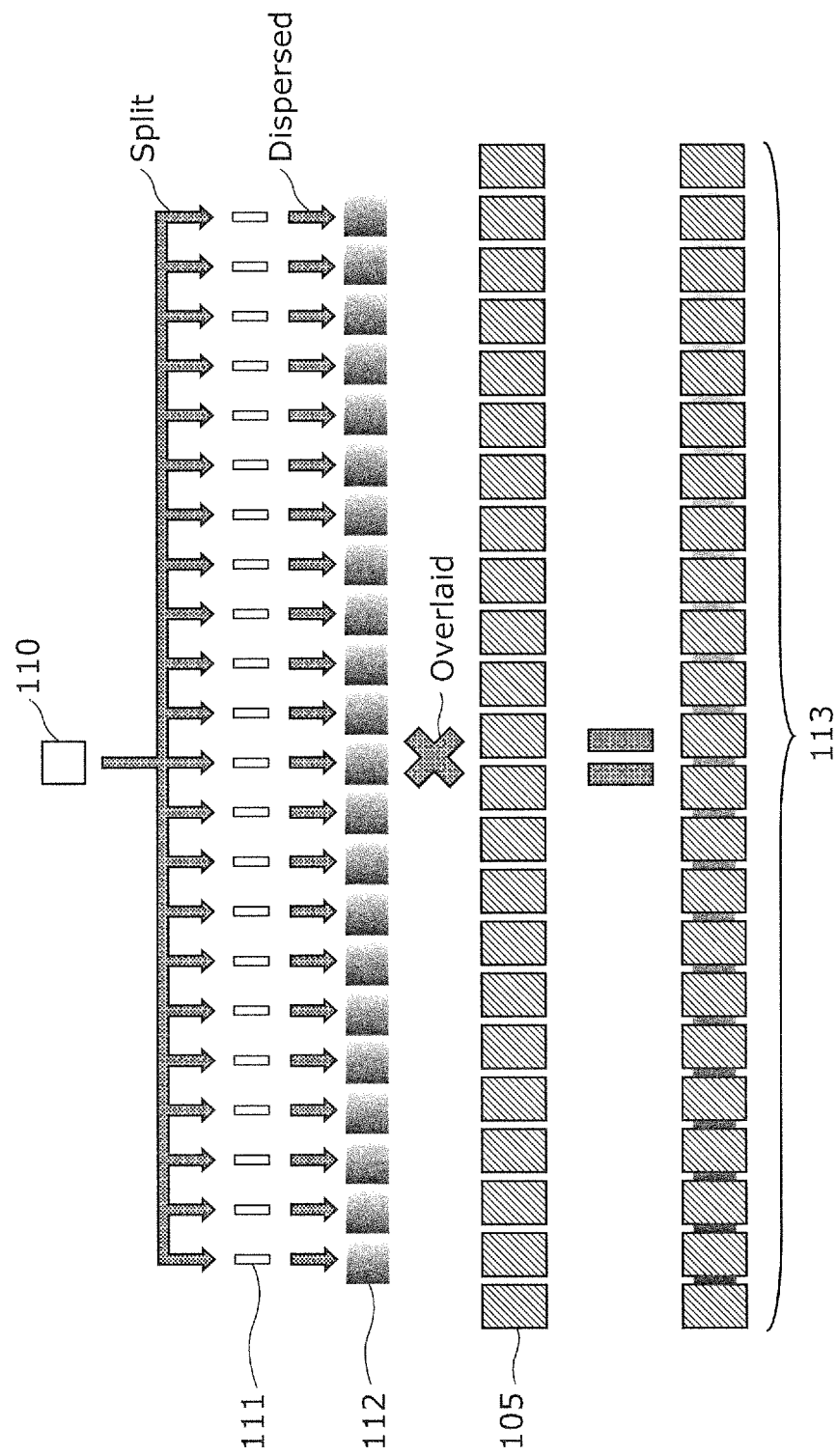
FIG. 7 is an explanatory drawing of the principle for measuring a spectrum.

The principle for measuring a spectrum using the moire pattern will be discussed below with reference to the drawings. FIG. 4 is a diagram illustrating an overlap of dispersed first fringes and second fringes according to Embodiment 1. FIG. 5 shows the moire pattern detection results when the input light 110 is monochromatic light of a first wavelength. FIG. 6 shows the moire pattern detection results when the input light 110 is monochromatic light of a second wavelength. FIG. 7 is an explanatory drawing of the principle for measuring a spectrum.

For example, if the input light 110 is monochromatic light, the first fringes 112 dispersed by the diffraction grating 103 form a striped pattern like the first fringes 111. In other words, the dispersed first fringes 112 has a monochromatic striped pattern like the first fringes 111. The dispersed first fringes 112 and the slit array 105 acting as second fringes are overlaid on each other so as to form the moire pattern 113 as illustrated in FIG. 4. At this point, the position of the dispersed first fringes 112 depends upon the wavelength of the input light 110, so that the moire pattern 113 also depends upon the wavelength of input light.

Referring to FIGS. 5 and 6, the principle for measuring the spectrum of the input light 110 with the dispersed first fringes 112 and the slit array 105 will be more specifically described below. In this case, the input light 110 is monochromatic light.

In FIGS. 5 and 6, (a) indicates the positional relationship between the dispersed first fringes 112 and pixels 107*p* of the image pickup device 107. Moreover, (b) indicates the positional relationship among the dispersed first fringes 112, the pixels 107*p* of the image pickup device 107, and the slit array 105. (c) indicates an intensity detected in each of the pixels 107*p* of the image pickup device 107.

Input light having the first wavelength forms first fringes 112*a* dispersed as illustrated in (a) of FIG. 5. As illustrated in (b) of FIG. 5, the dispersed first fringes 112*a* and the slit array 105 are overlaid on each other so as to generate the moire pattern.

Thus, as shown in (c) of FIG. 5, the intensity of the moire pattern is detected in each of the pixels. In this case, a peak intensity is detected in a pixel P5.

Input light having the second wavelength forms first fringes 112*b* dispersed as illustrated in (a) of FIG. 6. The dispersed first fringes 112*b* are shifted to the right from the dispersed first fringes 112*a* by a distance smaller than one pixel. This is because the input light of the first wavelength and the input light of the second wavelength have different diffraction angles in the diffraction grating 103.

As illustrated in (b) of FIG. 6, the dispersed first fringes 112*b* and the slit array 105 are overlaid on each other so as to generate the moire pattern. Thus, as shown in (c) of FIG. 6, the intensity of the moire pattern is detected in each of the pixels. In this case, a peak intensity is detected in a pixel P4. Specifically, the moire pattern in FIG. 6 is shifted to the left by one pixel from the moire pattern in FIG. 5.

The position of the moire pattern generated by an overlap of the dispersed first fringes 112 (vernier scale) and the slit array 105 (main scale) changes greater than the positions of the dispersed first fringes 112. This allows the spectroscope 100 to detect a small positional change of the dispersed first fringes 112, and thereby determine a small difference in the wavelength of input light.

Such a measurement is called a vernier effect in which two scales (a main scale and a vernier scale) are overlaid on each other with different pitches so as to measure a small change of the vernier scale in an enlarged view. In other words, the spectroscope 100 can improve spectrum resolving power according to the vernier effect in a band determined by the resolving power of the main scale.

As in the case of the monochrome input light, the intensity of input light containing light with multiple wavelengths can be measured at each wavelength. As shown in FIG. 7, the input light 110 is split by the cylindrical lens array 101 into the first fringes 111. The first fringes 111 are further dispersed by the diffraction grating 103 into the dispersed first fringes 112. At this point, the high-intensity region of the dispersed first fringe 112 has the spectrum distribution of the input light 110. The dispersed first fringes 112 and the slit array 105 are overlaid on each other so as to form the moire pattern 113. In the moire pattern 113, the spectrum distribution of each high-intensity region is extended, thereby improving the resolution of spectrum measurement.

[Method of Measuring a Spectrum]

Figure 8:
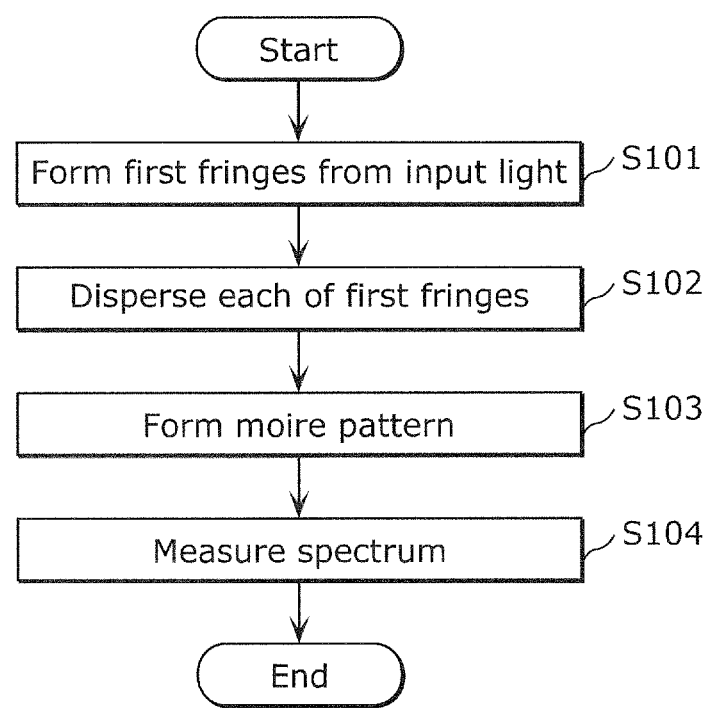
FIG. 8 is a flowchart showing the method of measuring a spectrum according to Embodiment 1.

A method of measuring a spectrum through the spectroscope 100 configured thus will be described below. FIG. 8 is a flowchart showing the method of measuring a spectrum according to Embodiment 1.

First, the cylindrical lens array 101 splits the input light 110 so as to form the first fringes 111 (S101). The diffraction grating 103 disperses each of the first fringes 111 to form the dispersed first fringes 112 (S102). The dispersed first fringes 112 are overlaid on the second fringes formed on the slit array 105, forming the moire pattern 113 (S103). The image pickup device 107 measures the spectrum of the input light 110 by detecting the moire pattern 113 (S104).

[Effects]

As described above, in the spectroscope 100 according to the present embodiment, a fringe former may include the cylindrical lens array 101. On the cylindrical lens array 101, light incident on each cylindrical lens is condensed onto a corresponding line. In other words, the cylindrical lens array 101 can reduce the width of the high-intensity region of the fringe as compared with the slit array because of the effect of condensing light in addition to the effect of reducing the width of the cylindrical lens. Unlike the slit array, the cylindrical lens array 101 does not block the input light 110, thereby suppressing a light quantity loss. In other words, the spectroscope 100 including the cylindrical lens instead of the slit array can suppress a light quantity loss, thereby improving the spectrum resolving power.

The fringe former particularly including the cylindrical lens array 101 can form a high-intensity region having a small width, that is, the first fringes with a high aspect ratio.

Furthermore, this configuration can also suppress a light quantity loss caused by the formation of the first fringes. For example, if the first fringe has an aspect ratio of 10, a light quantity loss can be reduced to one tenth or less than that of the slit array.

Embodiment 2

Figure 9:
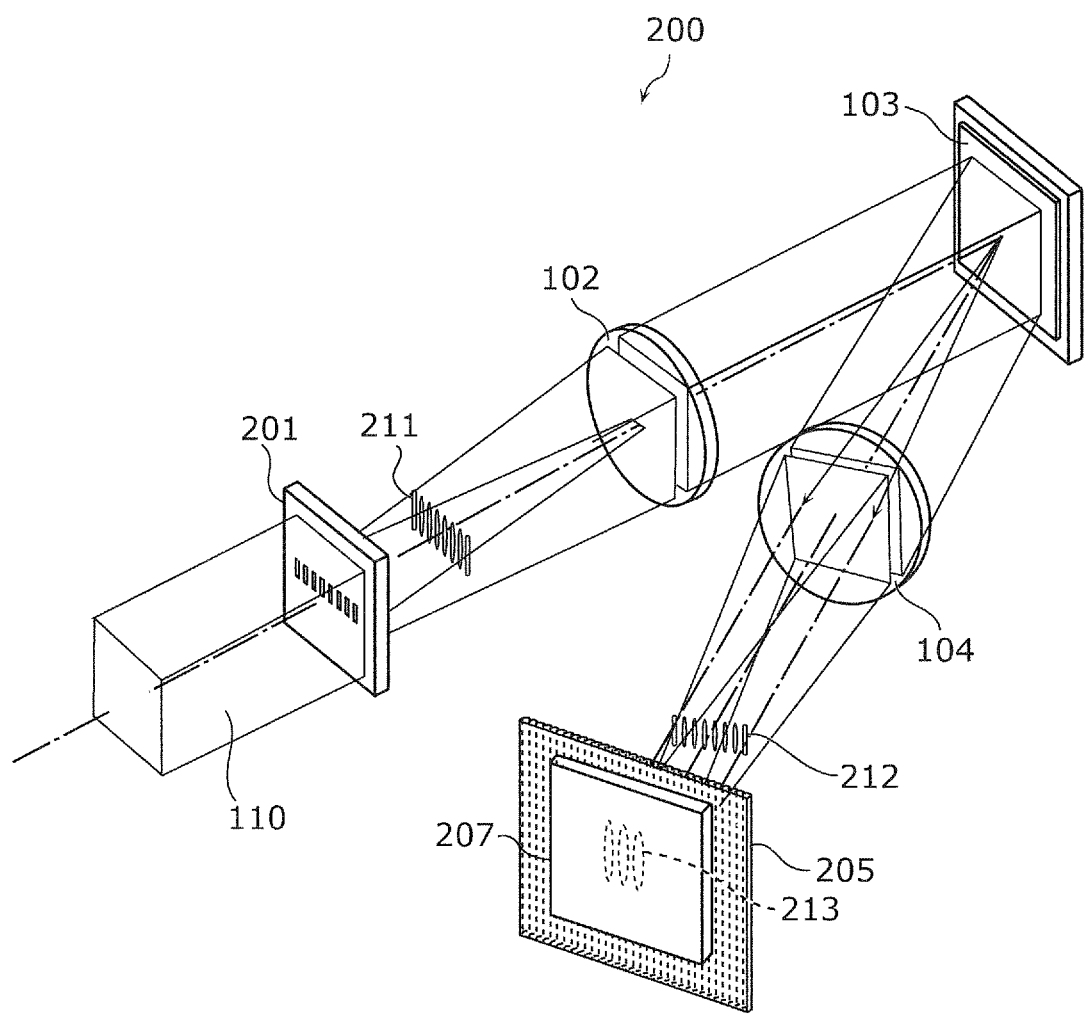
FIG. 9 is a diagram illustrating the configuration of a spectroscope according to Embodiment 2.
Figure 10:
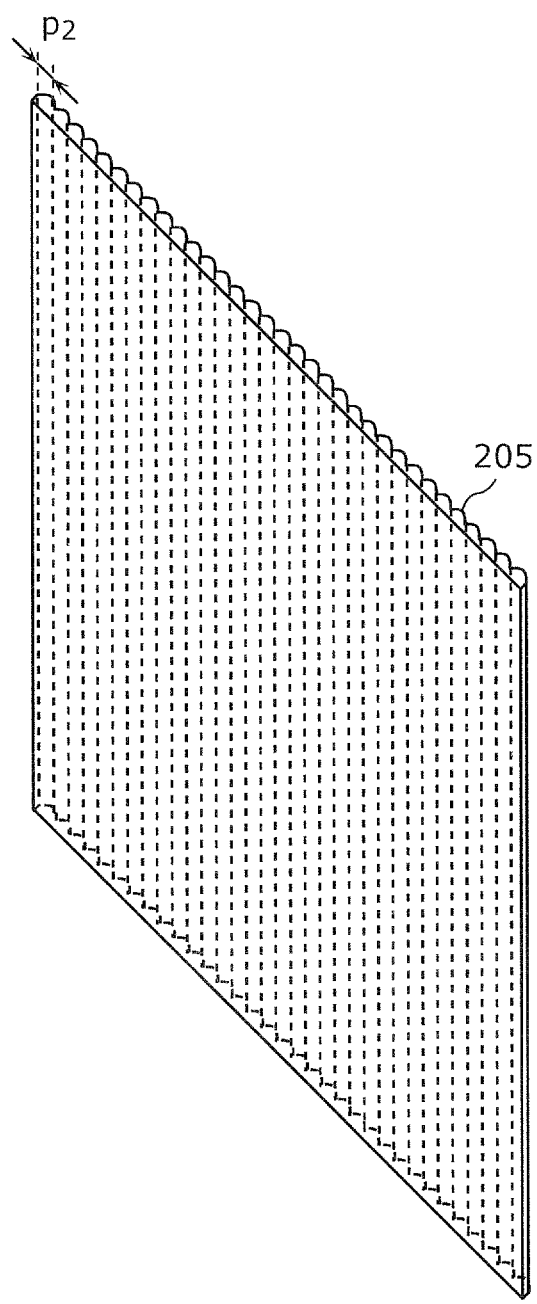
FIG. 10 is a perspective view illustrating a cylindrical lens array according to Embodiment 2.

Embodiment 2 will be described below with reference to the accompanying drawings. A spectroscope according to Embodiment 2 is different from Embodiment 1 in that a cylindrical lens array is used instead of a slit array on the output side. Regarding Embodiment 2, differences from Embodiment 1 will be mainly discussed below.
[Spectroscope Configuration]
FIG. 9 is a diagram illustrating the configuration of a spectroscope 200 according to Embodiment 2. FIG. 10 is a perspective view illustrating a cylindrical lens array 205 according to Embodiment 2. In FIG. 9, constituent elements substantially identical to those of FIG. 2 are indicated by the same reference numerals and the explanation thereof is optionally omitted.

As shown in FIG. 9, the spectroscope 200 includes a slit array 201, a first lens 102, a diffraction grating 103, a second lens 104, the cylindrical lens array 205, and an image pickup device 207.

The slit array 201 is an example of a fringe former that forms first fringes 211 with a first pitch p1 by splitting input light 110. The slit array 201 has a plurality of slits horizontally arranged with the first pitch p1. In other words, the first fringes 211 have a plurality of lines horizontally arranged with the first pitch p1.

The cylindrical lens array 205 is an example of a moire pattern former that forms moire 213 by overlaying the dispersed first fringes 212 on second fringes with a second pitch p2 different from the first pitch p1. The cylindrical lens array 205 has a plurality of cylindrical lenses placed with the second pitch p2 in the same direction as the dispersed first fringes 212. A moire pattern is formed by overlaying the first fringes and the cylindrical lens array (second fringes) (Non Patent Literature 1: A. Livnat, O. Kafri, "Moire pattern of a linear grid with a lenticular grating", OPTICS LETTERS, Optical Society of America, June 1982, Vol. 7, No. 6, p. 253-255).

The image pickup device 207 is an example of a measuring device that measures the moire pattern 213 at the focal position of the cylindrical lens array 205. The image pickup device 207 is, for example, a solid-state image pickup device such as a CCD image sensor or a CMOS image sensor. The image pickup device 207 is separated from the cylindrical lens array 205 by a focal distance. No lens may be provided between the image pickup device 207 and the cylindrical lens array 205.
[Effects]
In the spectroscope 200 according to the present embodiment, a moire pattern former may include the cylindrical lens array 205. Hence, a light quantity loss can be smaller than that of the slit array. If the moire pattern former is a slit array, the moire pattern is formed at the position of the slit array. For this reason, in order to eliminate the influence of blurring caused by defocus in the detection of the moire pattern, a relay lens (e.g., the third lens 106 of FIG. 2) or the like is necessary for forming an image of the moire pattern at a position separated from the slit array. If the moire pattern former is the cylindrical lens array 205, the moire pattern is formed at the position (focal position) separated from the cylindrical lens array 205 by the focal distance. Thus, the image pickup device 207 can detect the moire pattern at the focal position of the cylindrical lens array 205. Specifically, the image pickup device 207 can be directly disposed at the formation position of the moire pattern, thereby eliminating the need for a relay lens. This can reduce the number of parts of the spectroscope 200, thereby downsizing the spectroscope 200.

Embodiment 3

Figure 11:
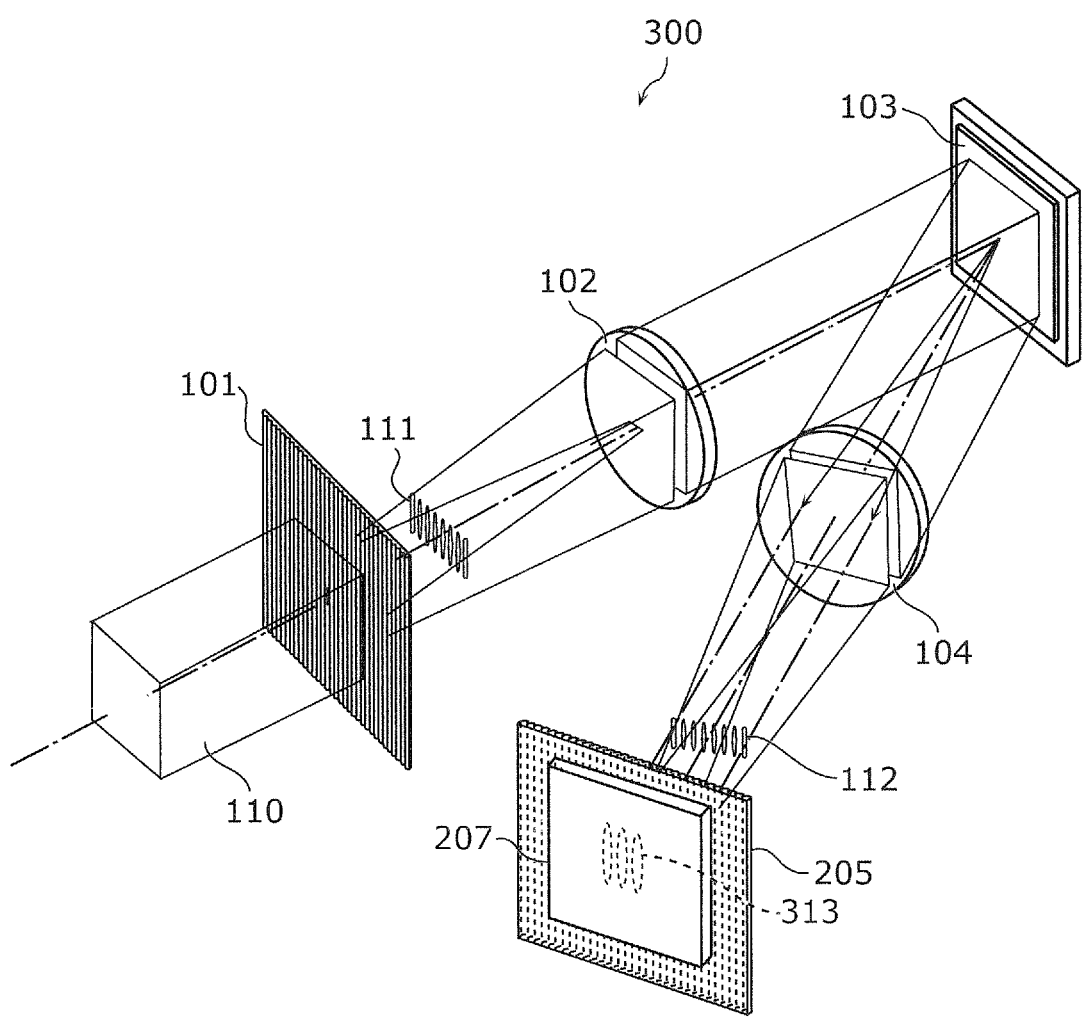
FIG. 11 is a diagram illustrating the configuration of a spectroscope according to Embodiment 3.

Embodiment 3 will be described below with reference to the accompanying drawings. A spectroscope according to Embodiment 3 is different from the Embodiments 1 and 2 in that a cylindrical lens array is used instead of a slit array on each of the input and output sides. Regarding Embodiment 3, differences from the Embodiments 1 and 2 will be mainly discussed below.
[Spectroscope Configuration]
FIG. 11 is a diagram illustrating the configuration of a spectroscope 300 according to Embodiment 3. In FIG. 11, constituent elements substantially identical to those of FIGS. 2 and 9 are indicated by the same reference numerals and the explanation thereof is optionally omitted.

As shown in FIG. 11, the spectroscope 300 includes a cylindrical lens array 101, a first lens 102, a diffraction grating 103, a second lens 104, a cylindrical lens array 205, and an image pickup device 207.

Figure 12A:
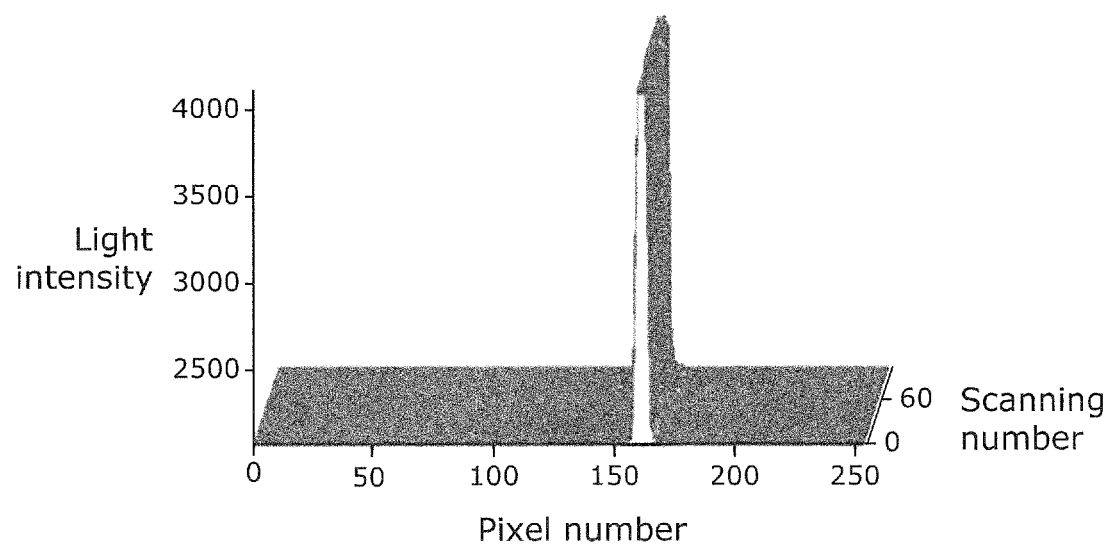
FIG. 12A is a graph showing the detection results of dispersed light in a typical spectroscope.
Figure 12B:
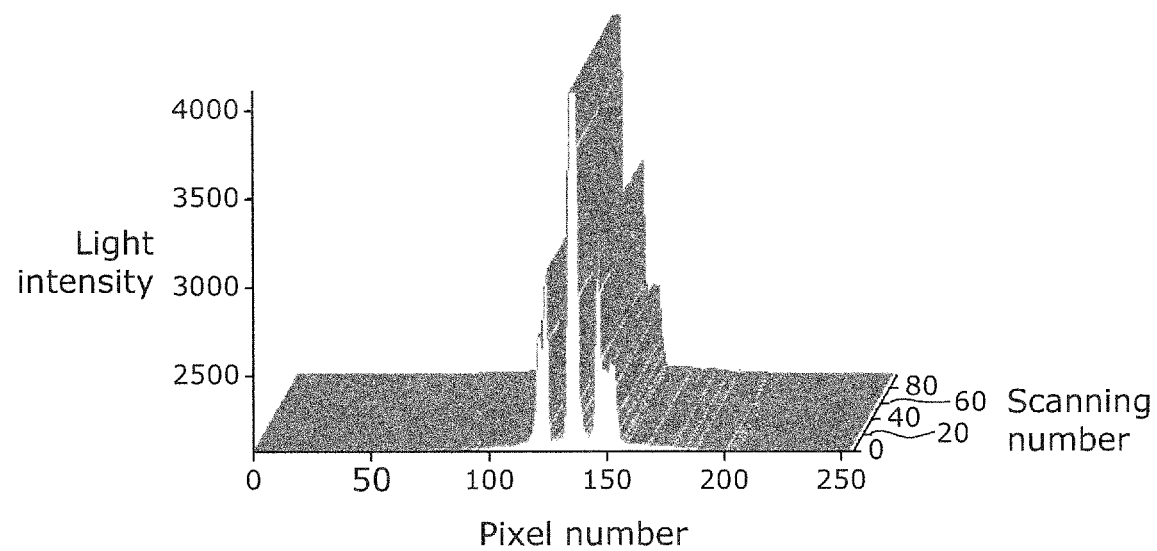
FIG. 12B is a graph showing the moire pattern detection results in the spectroscope according to Embodiment 3.

The spectroscope 300 includes the two cylindrical lens arrays 101 and 205. As in Embodiment 1, the cylindrical lens array 101 on the input side forms first fringes 111 by splitting input light 110. As in Embodiment 2, the cylindrical lens array 205 on the output side forms moire pattern 313 from dispersed first fringes 112.
[Effects]
As described above, the spectroscope 300 according to the present embodiment can achieve the effects of the Embodiments 1 and 2. In the spectroscope 300, in particular, a slit array does not block light and thus a light quantity loss can be further reduced. Referring to FIGS. 12A and 12B, a reduction in light quantity loss will be discussed below.

FIG. 12A is a graph showing the detection results of dispersed light in a typical spectroscope. FIG. 12B is a graph showing the moire pattern detection results in the spectroscope according to Embodiment 3. The typical spectroscope is a spectroscope that measures a spectrum by only using the angular dispersion property of a diffraction grating without a moire pattern.

In FIGS. 12A and 12B, a pixel number indicates a horizontal position of the image pickup device and a scanning number indicates a vertical position of the image pickup device. The intensity of light indicates light intensity measured at each pixel of the image pickup device. The detection results of input light are shown in the graphs. The input light is monochromatic light. The peak value of light intensity hardly changes between the typical spectroscope and the spectroscope according to Embodiment 3, proving that a light quantity loss for forming the moire pattern is suppressed.

Other Embodiments

The spectroscopes according to one or more aspects of the present invention were described according to the embodiments. The present invention is not limited to the embodiments. Without departing from the scope of the invention, various modifications may be made for the embodiments by a person skilled in the art or the constituent elements of the different embodiments may be combined within the scope of at least one aspect of the present invention.

For example, in the foregoing embodiments, a plurality of convex lenses are formed on one surface of the cylindrical lens array. The shapes of the lenses are not limited thereto. For example, the cylindrical lens array may be formed by changing a refractive index in the lens. In this case, the cylindrical lens array may not have any convex lenses. Alternatively, the convex lenses may be formed on both surfaces of the array. Specifically, the cylindrical lens array may have any shape as long as the array has optical functions identical or similar to those of the cylindrical lens arrays described in the embodiments.

For example, the spectroscope may have an optical filter for cutting light at wavelengths outside the measurement band. Light having passed through the wavelength filter is used as input light, so that the spectrum of the input light can be measured with high accuracy within the measurement band. At this point, the passband of the wavelength filter may be changed with the passage of time. Thus, the spectrum of input light can be measured in multiple measurement bands.

A dispersive device used in the embodiments is not limited to the diffraction grating. For example, the dispersive device may be a prism or an etalon.

A measuring device used in the embodiments is not limited to the image pickup device. For example, the measuring device may be a photodetector or a photosensitive film.

The spectroscope including the first lens and the second lens in the embodiments may not include the lenses. For example, the first lens or the second lens may be integrated with the cylindrical lens array.

In the embodiments, the spectroscope for measuring the spectrum of input light may be obtained as a wavelength measuring device for measuring the wavelength of input light. In this case, as illustrated in FIGS. 5 and 6, the measuring device only needs to measure the wavelength of input light by detecting the moire pattern.

This can suppress a light quantity loss, thereby improving wavelength resolving power.

INDUSTRIAL APPLICABILITY

A spectroscope according to one aspect of the present invention can improve resolving power when measuring the spectrum of input light. For example, the spectroscope is applicable to a Raman spectroscope.

REFERENCE SIGNS LIST 100, 200, 300 spectroscope
101, 205 cylindrical lens array
102 first lens
103 diffraction grating
104 second lens
105, 201 slit array
106 third lens
107, 207 image pickup device
107p pixel
110 input light
111, 211 first fringe
112, 112a, 112b, 212 dispersed first fringe
113, 213, 313 moire pattern

The invention claimed is:

1. A spectroscope for measuring a spectrum of input light, the spectroscope comprising:
    a fringe former including a first cylindrical lens array that forms fringes having a first pitch by splitting the input light;
    a dispersive device that disperses each of the fringes;
    a moire pattern former that forms a moire pattern by overlaying the fringes that have been dispersed, on a second cylindrical lens array having a second pitch different from the first pitch; and
    a measuring device that measures the spectrum of the input light by detecting the moire pattern at a focal position of the second cylindrical lens array.

2. A wavelength measuring device for measuring a wavelength of input light, the wavelength measuring device comprising:
    a fringe former including a first cylindrical lens array that forms fringes having a first pitch by splitting the input light;
    a dispersive device that disperses each of the fringes;
    a moire pattern former that forms a moire pattern by overlaying the fringes that have been dispersed, on a second cylindrical lens array having a second pitch different from the first pitch; and
    a measuring device that measures the wavelength of the input light by detecting the moire pattern at a focal position of the second cylindrical lens array.

3. A spectrum measuring method for measuring a spectrum of input light, the spectrum measuring method comprising:
    forming, by a first cylindrical lens array, fringes having a first pitch by splitting the input light;
    dispersing each of the fringes;
    forming a moire pattern by overlaying the fringes that have been dispersed, on a second cylindrical lens array having a second pitch different from the first pitch; and
    measuring the spectrum of the input light by detecting the moire pattern at a focal position of the second cylindrical lens array.

* * * * *